United States Patent
Wu et al.

[11] 3,924,682
[45] Dec. 9, 1975

[54] METHOD OF TREATING A HIGH TEMPERATURE FORMATION TO PERMIT THE USE THEREIN OF TEMPERATURE SENSITIVE SURFACTANTS

[75] Inventors: Ching H. Wu; Alfred Brown; Wann-Sheng Huang; Yick-Mow Shum, all of Houston, Tex.

[73] Assignee: Texaco Inc., New York, N.Y.

[22] Filed: Oct. 16, 1974

[21] Appl. No.: 515,276

[52] U.S. Cl. ................. 166/274; 166/252; 166/273
[51] Int. Cl.² ..................... E21B 43/22; E21B 43/24
[58] Field of Search ........... 166/273, 274, 272, 302, 166/303, 252

[56] References Cited
UNITED STATES PATENTS

| | | |
|---|---|---|
| 3,357,487 | 12/1967 | Gilchrist et al. ................ 166/274 X |
| 3,369,602 | 2/1968 | Fallgatter et al. .................... 166/273 |
| 3,371,710 | 3/1968 | Harvey et al. ...................... 166/273 |
| 3,414,053 | 12/1968 | Treiber et al. ...................... 166/273 |
| 3,437,141 | 4/1969 | Brandner et al. .................... 166/273 |
| 3,707,190 | 12/1972 | Davis, Jr. et al. .................... 166/273 |
| 3,788,399 | 1/1974 | Fauerbacher et al. ............... 166/274 |

*Primary Examiner*—Stephen J. Novosad
*Attorney, Agent, or Firm*—T. H. Whaley; C. G. Ries; Jack H. Park

[57] ABSTRACT

Surfactant flooding is an effective means of increasing the total recovery from a subterranean, petroleum containing formation, however, most surfactants suitable for use in surfactant flooding operations hydrolyze or otherwise decompose at temperatures above about 120°F, and the temperature of most subterranean petroleum containing formations is in excess of 120°F. Surfactants may be employed in tertiary recovery in formations whose temperatures are greater than the temperature stability limit of the surfactants if the formation temperature is first reduced by introducing an aqueous fluid such as water at a temperature substantially below the temperature limit of the surfactant into the formation for a period of time sufficient to reduce the formation temperature to a value at or below the temperature tolerance level of the surfactant.

10 Claims, 2 Drawing Figures

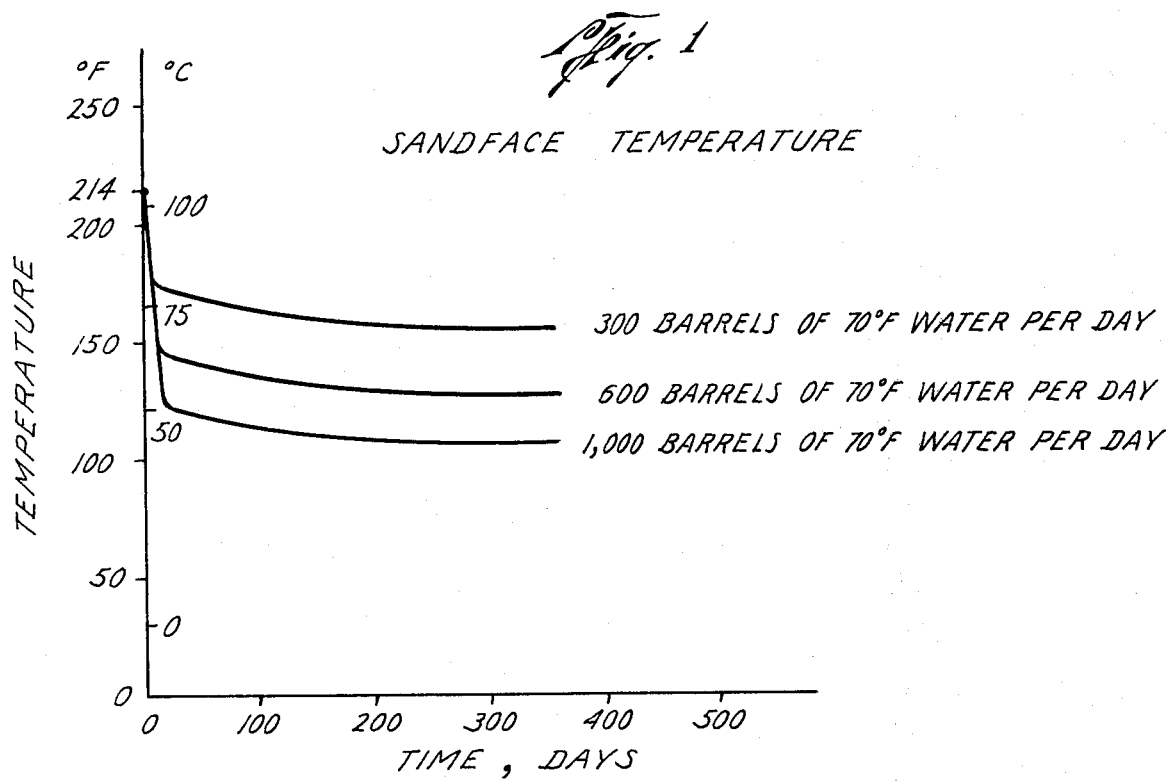
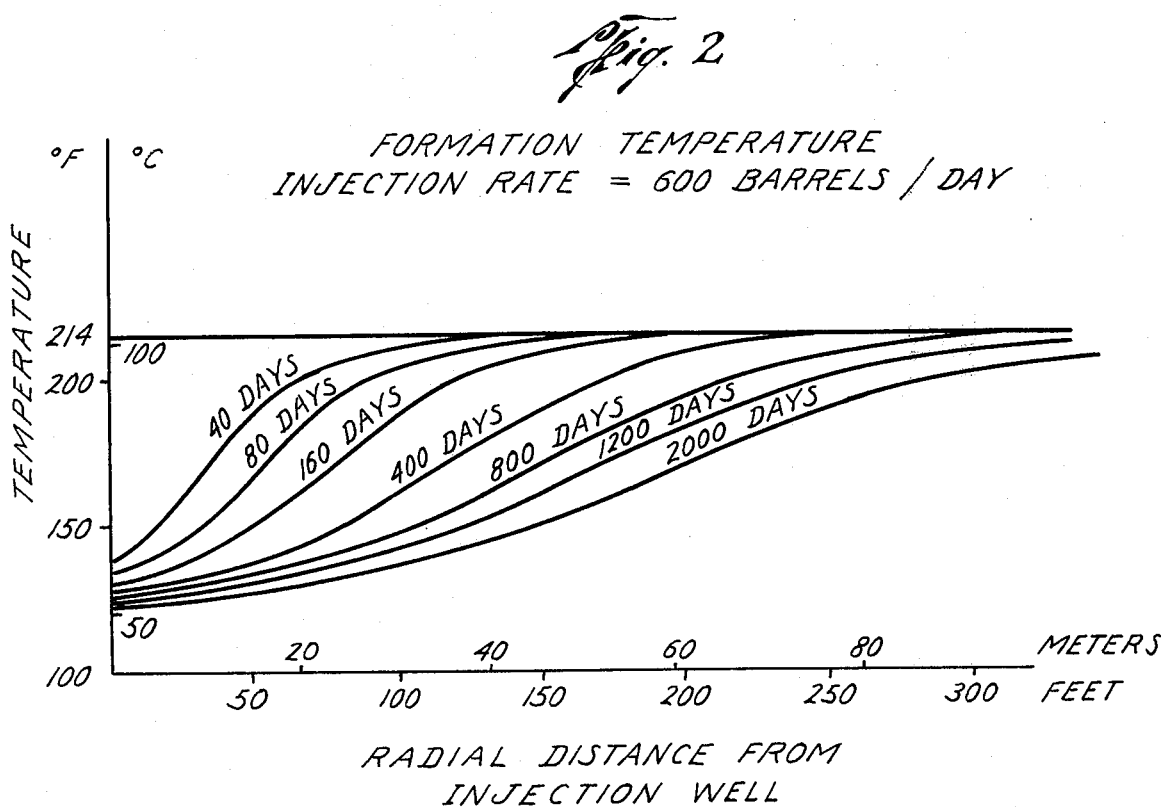

METHOD OF TREATING A HIGH TEMPERATURE FORMATION TO PERMIT THE USE THEREIN OF TEMPERATURE SENSITIVE SURFACTANTS

BACKGROUND OF THE INVENTION

1. Field of the Invention

This invention concerns a process for pretreating high temperature, petroleum containing formations so petroleum may be recovered therefrom by the use of temperature sensitive surfactant.

2. Description of the Prior Art

Many subterranean, petroleum containing formations contain natural energy in the form of an active bottom water drive, solution gas drive, or a gas cap drive, in sufficient quantity to drive the petroleum through the formation to the production well from which it may be recovered to the surface of the earth. This phase of oil recovery, commonly known as primary recovery, recovers only a small portion of petroleum originally in place. when the natural energy source has been depleted, or in those formations where insufficient natural energy was originally present to permit primary recovery, some form of supplemental treatment is required to recover additional petroleum from the formation. Water flooding is by far the most economical and widely practiced supplemental recovery procedure and involves injecting water into the formation by one or more injection wells. The injection water displaces or moves the petroleum toward one or more production wells, where it is transported to the surface of the earth. Although considerable additional oil is usually recovered as a consequence of water flooding, as a general rule around 50% or more of the oil originally present in the formation remains in the formation after termination of water flooding.

It is well known in the field of oil recovery that the inclusion of a surface active material or a surfactant in the flood water will increase the recovery efficiency by a substantial amount. Many materials have been proposed for use in surfactant oil recovery processes. Petroleum sulfonate is a particularly popular material at the present time, although other surfactants such as alkyl or alkylaryl sulfonates or phosphonates, as well as polyethoxylated alkyl phenols or alcohols are known in the art to be very useful for oil recovery operations.

Although it has been demonstrated in laboratory tests and published in the art, that the inclusion of surfactant materials in flood water will recover substantial amounts of petroleum from petroleum saturated cores or sand packs under laboratory conditions, there are many conditions existing in subterranean petroleum containing formations which significantly degrades the performance of surfactant solution injection. For example, it is known that presence of high salinity formation water, or water containing abnormal quantities of polyvalent ions such as calcium or magnesium will interfere with the proper functioning of the surfactant, and either of these interfering ions must be displaced prior to the injection of the surfactant solution, or else a surfactant tolerant of such ions must be used.

Another problem which interferes with the proper functioning of the surfactant at a subterranean petroleum containing formation is the temperature limitation of most surfactants. Most of the surfactants proposed up to the present time for use in surfactant oil recovery processes will hydrolyze or otherwise deteriorate in aqueous solution when exposed to temperatures in excess of 120°F for long periods of time. Since a great many subterranean petroleum containing formations are hotter than 120°F, and since the surfactant solution injected into a subterranean, petroleum containing formation will ordinarily be in the formation for a period of many months, the hydrolysis or other degradation of this surfactant material would materially degrade the surfactant recovery efficiency.

In view of the foregoing discussion, it can be appreciated that there is a substantial, unfulfilled need for a method for conducting surfactant oil recovery process in subterranean, petroleum containing formations whose temperature is in excess of 120°F.

BRIEF DESCRIPTION OF THE DRAWINGS

FIG. 1 illustrates the formation temperature at the injection well at three values of cooling fluid injection rates.

FIG. 2 illustrates the temperature in a formation at various distances from the point of injection of a cooling liquid at seven different periods of injection.

SUMMARY OF THE INVENTION

We have discovered that it is possible to cool a subterranean, petroleum containing formation to a temperature below the temperature limits of the surfactant solution to be employed in a surfactant oil recovery process in the formation. It is possible to achieve the temperature reduction in some cases by injection of surface ambient temperature water into the formation for a period of time substantially longer than would ordinarily be accomplished in a conventional water flooding operation, i.e. for long periods of time past the point when the produced fluid is essentially 100% water. In another embodiment, the water or other aqueous fluid being injected into the subterranean formation is cooled to a temperature lower than surface ambient temperature prior to injection of the aqueous fluid into the formation. Mechanical refrigeration, gas adsorption, or direct evaporization in air in arid climates may be utilized to cool the water prrior to injection into the formation. If the reservoir parameters are known, the time necessary to inject an aqueous fluid of any preselected temperature into the formation in order to reduce the temperature of the formation to the desired level may be calculated by means disclosed herein below. The aqueous cooling fluid may also contain chemicals for the purpose of accomplishing other desired chemical pretreatment of the formation, such as adjusting the salinity and/or hardness of the formation water to the point at which optimum surfactant response is achieved, or sacrificial adsorption reagents may be included for the purpose of adsorbing on the formation surfaces to prevent surfactant adsorption, or incorporating a chemical to control water sensitive clay materials contained in the formation so as to prevent loss of formation permeability.

DESCRIPTION OF THE PREFEERRED EMBODIMENT

Briefly, the process of out invention involves introducing a fluid into a subterranean, petroleum containing formation, the fluid being at a lower temperature than the formation and passing the cooling fluid through the formation for a period of time sufficient to reduce the formation temperature so that the temperature sensitive surfactants may be injected safely into the formation for oil recovery purposes.

The temperature of the cooling fluid should be substantially less than the maximum temperature at which the surfactant is stable. Preferably the temperature of the coolind fluid is at least 50°F less than the maximum temperature at which the surfactant is stable.

Water injection or water flooding is, of course, well known in the art of oil recovery, and when surface temperature water is injected into a subterranean, petroleum containing formation for the purpose of displacing the petroleum toward the production well in a conventional waterflood operation, a limited amount of cooling of the formation occurs as a necessary consequence of water injection. It is common practice in water flooding, however, to terminate water injection when the water-oil ratio begins to increase to the point that further fluid production is no longer economically feasible. As a general rule, the water-oil ratio will be quite low initially since a bank of oil is formed in the formation as a consequence of water injection, and little or no water is procuced along with the oil during the time that this bank of oil is being produced. Once the trailing edge of the bank reaches the production well, the percentage of water produced increasing rapidly. Once the water-oil ratio is above about 25 or 30, further injection of water and production of water and oil from the production well is no longer economically feasible in the ordinary context of secondary recovery, and so water injection is terminated and further production of fluids from the production wells is similarly terminated. Since the production is terminated shortly after water reaches the production well, very little water passes through the formation in the immediate vicinity of the production well, and so the formation cooling effect in conventional water flooding is restricted to the portion of the formation immediately adjacent the water injection well and does not extend sufficiently far into the formation to accomplish the desired result of reducing the over all formation temperature so temperature-sensitive surfactants may be utilized.

In some instances, it is possible to achieve the desired formation temperature reduction by continuing injection of surface ambient tamperature water such as is used in water flooding operations for a much longer period of time than would ordinarily be done in a conventional water flood operation. This requires that water injection must continue long after the fluid being produced at the production well goes to substantially 100% water. The produced water may be recirculated to minimize water disposal problems, but in that event it will probably be necessary to cool the water prior to reinjection since the water temperature exiting from the production well will naturally be considerably higher than the temperature of the water being injected. If a convenient disposal area is available for the water, and an abundant supply of suitable injection water is available, the desired temperature reduction may be achieved by simply continuing injection of surface ambient temperature water into the formation. In any event, it will be necessary to determine the time duration of water injection, and this will be accomplished in essentially the same manner as if the water is cooled prior to being injected. The method for calculating the injection time necessary to achieve a desired temperature reduction will be given hereinafter below.

The more usual situation in the practice of the process of our invention will involve some type of cooling process whereby the temperature of the water may be reduced either below surface ambient temperature or below the temperature of the water being produced from the production well. Water may be cooled by the use of mechanical refrigeration or a gas fired absorption process is quite satisfactory. If the operation is being conducted in an arid region, it is satisfactory to pass the water through a cooling tower or some device to expose the water to dry air so that the water will be cooled by evaporation. Direct heat exchangers may also be used in the instance of application of the process of our invention during winter months or in cold climates. Whenever possible, it is preferred to use air evaporation or air heat exchangers to avoid the use of mechanical refrigeration because of the operational cost involved in mechanical cooling process.

The fluid may be cooled to any temperature above its freezing point and substantially less than, preferably at least 50°F less than the maximum temperature at which the surfactant to be used will be stable for the period of time it will be in the formation.

The problem of calculating the time of injection required to achieve the desired temperature drop involves first calculating the heat gained by the injected cold water as it passes down the injection well bore and then from the point of injection radially outward into the formation. The problem then becomes essentially the same as one of calculating the heat loss in the instance of injecting a thermal fluid, which problem has been quite well worked out for steam injection situations. The only difference is that heat is gained as the fluid passes down the injection well bore and outward into the formation, rather than being lost as is the case for steam flooding.

The heat loss-gain problem becomes one more readily handled if it is subdivided into the two principal steps:

1. The heat gain as the cold fluid is injected down the injection well bore, and
2. The heat gained as the fluid passes from the point of injection radially outward into the formation.

In the first step of calculating the heat gained by the injected cold fluid, consider the passage of the fluid through a radial injection well bore. The heat gained by the flowing fluid may be expressed by means of the following equation (1).

$$Q_G = H_{out} - H_{in} = q_w C_w \rho_w (T_{out} - T_{in}) \quad (1)$$

where $Q_G$ = heat gained by the fluid passing down the injection well bore.

$H_{in}$ = enthalpy of the water at the inlet end of the injection well bore.

$H_{out}$ = enthalpy of water at the outlet end of the injection well bore.

$q_w$ = volumetric water injection rate $C_w$ = the specific heat capacity of water $\rho_w$ = water density $T_{in}$ = tubing temperature at the inlet end $T_{out}$ = tubing temperature at the outlet end.

Assuming that the amount of heat transferred across the well annulus from the formation to the fluid passing through the injection well is instantaneously supplied from the formation gives equation (2):

$$Q_G = UA_{to} (T_c - T_t) = \pi D_c L \Phi \quad (2)$$

The middle term represents an overall heat transfer across the annulus:

$U$ = overall heat transfer coefficient
$A_{to}$ = total heat transfer area
$T_t$ = average tubing temperature, $(T_{out} - T_{in})/2$
$T_c$ = average casing temperature The right hand side represents conductive heat transfer from the formation around the well bore:

$D_c$ = casing diameter
L = casing length of the controlled segment
$\Phi$ = heat flux determined by a superposition method based on the variation of $T_c$ with time.

By considering that the injection well is divided along its long axis into a number of segments, equation 1 is solved for each segment from the well head to the sand face by a trial and error method to determine the injected water temperature at the sand face. Since in most formations, there is a relatively constant thermal gradient between the surface and the formation, the calculations are relatively straightforward.

The second step involves the heat gained by the injection fluid as it passes outward from the injection well point of injection into the formation. Assuming essentially radial spreading of the injected fluid uniformly throughout the full formation thickness, gives equation (3):

$$2\pi r (\Delta r) h (\rho C)_p \Delta T = -k_p \left[ 2\pi \left. r - \frac{\Delta r}{2} \quad h \Delta t \frac{(\Delta T)}{(\Delta r)} \right|_{r - \frac{\Delta r}{2}} \right]$$

$$+ k_p \left[ 2\pi \left. r + \frac{\Delta r}{2} \quad h \Delta t \frac{(\Delta T)}{(\Delta r)} \right|_{r t \frac{\Delta r}{2}} \right] + 4\pi r \Delta r k_s \left. \frac{\Delta T}{\Delta Z} \right|_{Z=h} \Delta t$$

$$+ \frac{i_w h (H_{cw} - H_w)}{T_{cw} - T_o} \left[ T \left|_{r - \frac{\Delta r}{2}} - T \right|_{r + \frac{\Delta r}{2}} \right] \Delta t$$

i.e.
Heat Accumulation = Heat Conduction In − Heat Conduction Out + Heat Flux from Bonding Formation
+ Heat Convection In − Heat Convection Out, where
r = radial coordinate
h = reservoir thickness
$(\rho C)_p$ = composite heat capacity of pay zone
$\Delta T$ = temperature increment
$K_p$ = pay zone thermal conductivity
$\Delta t$ = time increment
Z = vertical coordinate
$k_s$ = bonding formation thermal conductivity
$i_w$ = water injection rate
$H_{cw}$ = enthalpy of injected cold water
$H_w$ = enthalpy of water at reservoir temperature
$T_{cw}$ = injected water temperature (sand face)
$T_o$ = reservoir temperature The above equation may be solved numerically to obtain the temperature distribution in the reservoir as a function of injection time. Solutions of this equation for a series of preselected values of time and water temperature yield a series of curves similar to that given in the attached FIG. 2 for a particular application. Any one curve gives the temperature in the formation as a function of distance from the point of injection.

EXAMPLES

Mathematical calculations based on the above formula were performed using field data from the caillou Island Field in Louisiana. The reservoir properties and completion data are listed in Table I.

TABLE I

RESERVOIR AND COMPLETION DATA
Caillou Island Field

| | |
|---|---|
| Depth | 11,000 ft. |
| Formation Thickness | 27 ft. |
| Reservoir Temperature | 214°F |
| Permeability | 2400 millidarcies |
| Porosity | 27% |
| Oil Saturation | 65% |
| Oil Viscosity | 0.10 centipoise at 214°F |
| Water Viscosity | .28 centipoise at 214°F |

The calculations were made on the assumption that a 30 acre inverted five spot pattern was used, that the injection tubing was three inches internal diameter and the casing was five inches internal diameter. Calculations were made for injection rates of 300, 600, and 1,000 barrels of water per day, at an assumed injection water temperature of 70°F.

In the first step, the water at the injection well point of entrance into the formation, e.g. the sand face temperature was calculated for each of the three injection rates, and the results are shown graphically in FIG. 1.

The sand face temperature as a function of time for the three injection rates are given in FIG. 1. It can be seen that the sand face temperature drops dramatically in the first 10 days of cold water injection, and thereafter levels off to a nearly constant value quite quickly. The value at which it becomes constant is, however, a function of the cold water injection rate, with the sand face constant temperature being lower with high injection rates.

The formation temperature at any point away from the injection well is shown in FIG. 2 for the 600 barrel per day injection rate case. As can be seen, depending on the number of days of injection, one can determine the temperature at any particular distance from the injection well. All of the temperature profile lines tend to approach the original formation temperature, but the distance from the injection well at which they reach the original formation temperature increases with increasing period of cold water injection.

At greater injection rates, the formation temperature reduction to the desired level can be extended deeper into the formation. For example, at a water injection rate of 1,000 barrels per day and an injection period of 1600 days, the reservoir temperature 200 ft. from the injection well can be lowered from 214°F to less than 150°F.

It can be seen from the above that the cooling effect may be increased by injecting at a higher rate or for longer periods of time. Of course, the surfactant solution should be injected at the same temperature as the cooling fluid solution in order to maintain the reduced temperature effect within the formation. The temperature profile lines shown in the attached figures are dynamic conditions, and the temperature at any point in the formation will begin to increase when the injection of cold fluid into the formation is terminated. Accordingly, any fluids injected prior to the surfactant solution or the surfactant solution itself should similarly be reduced in temperature to the desired cooling fluid temperature in order to ensure that the surfactant solution is not subjected to temperatures greater than its decomposition level. The polymer solution which is frequently used as a mobility buffer subsequent to the surfactant solution should also be cooled to a similar level, in order to ensure that there will be no temperature rise on the trailing edge of the surfactant band. It is generally necessary to cool any subsequent water injection after the mobility buffer solution, and surface ambient temperature water may be used to displace the polymer solution through the formation so long as a suitable quantity of cold fluid has been injected subsequent to the surfactant solution.

Field Example

The following field example is offered for purposes of additional disclosure only and is not intended to be in any way limitative or restrictive of our invention.

A surfactant flood is contemplated in a reservoir having the following properties:

| | |
|---|---|
| Depth | 1646 meters (5400 ft.) |
| Thickness | 10.4 meters (34 ft.) |
| Reservoir Temperature | 52°C (154°F) |
| Permeability | 0.3 $\mu m^2$ (315 md.) |
| Porosity | 27% |
| Initial Oil Saturation | 58% |
| Oil Viscosity at .0021 Pa-s (2.1 centipoise) at the formation temperature | |

In the first step, heat gain calculations are performed as given above assuming 70°F water temperature, and it is determined that at an injection rate of 300 barrels of water per day the temperature at the sand face drops initially as described previously, and then levels out at approximately 102°F. At 600 barrels of 70°F water per day, the sand face temperature becomes constant at about 90°F; at 1000 barrels of 70°F water per day, the sand face temperature levels out at about 80°F; at 3000 barrels of 70°F water per day, the constant level is about 75°F; and at 5000 barrels of water per day, about 70°F.

The formation temperature at depth was determined for the 1000 barrels of water per day injection rate case assuming the injection temperature is 70°F. The formation temperature is reduced to 125° at 50 ft. distance in 40 days; at approximately 75 ft. in 80 days; at approximately 105 ft in 160 days; at 164 ft. in 400 days; at 210 ft. in 1200 days; and 240 ft. in 2000 days.

Based on the above calculations, the flood is performed as follows. Cold water at a temperature of 70°F is injected into the formation at an injection rate of 1000 barrels per day for 400 days, until a total of 400,000 barrels of cold water has been injected. Thereafter a 102,816 barrel slug of surfactant solution is injected into the formation at 1000 barrels per day. The temperature of the surfactant solution is also maintained at 70°F in order to maintain the dynamic cooling conditions in the formation. The surfactant solution is a 2% petroleum sulfonate solution. After conclusion of the surfactant solution injection phase, 70° water is injected into the formation to displace the surfactant through the formation. The above calculations are based on a five acre, five spot pattern. Using a five acre, five spot pattern, an additional 34.6 percent of the oil is recovered. In using a 30 acre pilot, only six additional percent is recovered because of the difficulty in cooling the greater areas involved.

Thus we have disclosed and shown how a subterranean petroleum containing formation may be exploited by means of a surfactant flooding even though the safe temperature limit of the surfactant is substantially below the formation temperature if the formation is first preconditioned by injecting cold fluid such as water at a temperature well below the surfactant temperature limit into the formation for a suitable period of time to reduce the formation temperature to a safe limit. While our invention has been described in terms of a number of illustrative embodiments, it is not so limited since many variations thereof will become apparent to persons skilled in the art of supplemental oil recovery without departing from the true spirit and scope of our invention. Similarly, while a mechanism has been described to explain the benefits resulting from the use of our process, it is not necessarily represented hereby that this is the only or even the principal mechanism responsible for these benefits, and we do not wish to be bound by any particular explanation of the mechanism involved. It is our intention and desire that our invention be restricted and limited only by those limitations and restrictions as appear in the claims appended hereinafter below.

We claim

1. A method of recovering petroleum from a subterranean, petroleum containing formation by means of surfactant flooding wherein the formation temperature exceeds the temperature at which the surfactant is stable which comprises:

introducing a cooling fluid into the formation at a temperature substantially lower than the temperature at which the surfactant is stable for a period of time sufficient to reduce the portion of the formation to be contacted by the surfactant to a temperature level at which the surfactant is stable.

2. A method as recited in claim 1 wherein the cooling fluid is subjected to the step of cooling by refrigeration prior to injecting the same into the formation.

3. A method as recited in claim 1 wherein the cooling fluid is injected at surface ambient temperature and injection thereof is continued well past the point where the fluid being recovered from the formation is substantially all water, sufficient to reduce the temperature in the formation near the production well to the predetermined temperature at which the surfactant is stable.

4. A method as recited in claim 1 wherein the cooling fluid is water.

5. A method as recited in claim 4 wherein the water salinity is adjusted to precondition the formation for optimum surfactant performance.

6. A method as recited in claim 4 wherein the hardness of the cooling fluid is adjusted to a level to precondition the formation for optimum surfactant performance.

7. A method as recited in claim 1 wherein the cooling fluid temperature is at least 50°F lower than the temperature at which the surfactant is stable.

8. A method as recited in claim 1 wherein the formation temperature is reduced to a value below 125°F.

9. A method for recovering petroleum from a subterranean, petroleum-containing formation by surfactant flooding, said formation being penetrated by at least one injection well and by at least one production well comprising:

a. injecting an aqueous fluid into the formation, the temperature of the fluid being less than the maximum temperature at which the surfactant is stable;

b. injecting a surfactant solution into the formation, the temperature of the surfactant solution being less than the maximum temperature at which the surfactant is stable; and c. recovering petroleum from the formation.

10. A method as recited in claim 9 wherein the temperature of the aqueous fluid is at least 50°F lower than the maximum temperature at which the surfactant is stable.

* * * * *